(12) United States Patent
Song

(10) Patent No.: US 7,444,654 B2
(45) Date of Patent: Oct. 28, 2008

(54) OPTICAL DISC CARTRIDGE CASING PROVIDING FOR EASY DISC INSERTION/REMOVAL

(75) Inventor: In-Sang Song, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 375 days.

(21) Appl. No.: 10/938,642

(22) Filed: Sep. 13, 2004

(65) Prior Publication Data

US 2005/0060736 A1    Mar. 17, 2005

(30) Foreign Application Priority Data

Sep. 15, 2003    (KR) .................. 10-2003-0063791

(51) Int. Cl.
  *G11B 23/03*    (2006.01)
  *G11B 3/70*    (2006.01)
(52) U.S. Cl. ...................... 720/733; 720/738
(58) Field of Classification Search ......... 720/732–734, 720/738–743; 360/132, 133
See application file for complete search history.

(56) References Cited

U.S. PATENT DOCUMENTS

| | | | |
|---|---|---|---|
| 6,269,074 B1* | 7/2001 | Funawatari et al. ......... | 720/735 |
| 7,360,229 B2* | 4/2008 | Kang et al. ................. | 720/734 |
| 2001/0043556 A1* | 11/2001 | Seo et al. .................. | 369/291 |
| 2002/0031080 A1* | 3/2002 | Inoue ........................ | 369/291 |
| 2003/0156533 A1* | 8/2003 | Yim et al. .................. | 369/291 |
| 2003/0179696 A1* | 9/2003 | Eum et al. .................. | 369/291 |
| 2003/0235144 A1* | 12/2003 | Eum et al. .................. | 369/291 |
| 2004/0052204 A1* | 3/2004 | Okazawa et al. ............ | 369/291 |
| 2004/0163099 A1* | 8/2004 | Hashizume et al. ......... | 720/738 |
| 2004/0205809 A1* | 10/2004 | Saji et al. ................... | 720/741 |
| 2005/0050573 A1* | 3/2005 | Shiomi et al. ............... | 720/738 |

* cited by examiner

*Primary Examiner*—Brian E. Miller
*Assistant Examiner*—Matthew G Kayrish
(74) *Attorney, Agent, or Firm*—Birch, Stewart, Kolasch & Birch, LLP

(57) ABSTRACT

An optical disc cartridge of the present invention includes: a casing provided with a disc inserting/opening part for inserting/taking out a disc thereinto/therefrom at an upper surface thereof and an access hole which an optical pickup approaches at a lower surface thereof; a pair of shutters mounted in the casing and opening/closing the access hole and fixing the optical disc; a rotary wheel rotatably positioned on the shutters and moving the shutters; a wheel fixing/releasing means mounted at one side in the casing and fixing/releasing the rotary wheel; and a disc fixing/releasing means movably mounted at the casing and limiting inserting/taking out the disc into/from the disc inserting/opening part by adjusting a size of the disc inserting/opening part. Accordingly, the optical disc cartridge having such a construction facilitates a job of accommodating/taking out a high density optical disc in/from a disc recording and/or reproducing apparatus, and an apparatus of recording or reproducing data on or from an optical disc, comprising: a driving unit rotating an optical disc inserted in the optical disc cartridge; and a recording or reproducing unit recording or reproducing data on or from the optical disc.

9 Claims, 7 Drawing Sheets

--Related Art--

OPTICAL DISC CARTRIDGE CASING PROVIDING FOR EASY DISC INSERTION/REMOVAL

This Nonprovisional application claims priority under 35 U.S.C. § 119(a) on patent application Ser. No(s). 10-2003-0063791 filed in Korea, Republic of on Sep. 15, 2003, the entire contents of which are hereby incorporated by reference.

BACKGROUND OF THE INVENTION

1. Field of the Invention

The present invention relates to an optical disc cartridge, and more particularly, to an optical disc cartridge which enables to facilitate accommodating the optical disc in the cartridge or taking out the accommodated optical disc in order to use the cartridge or directly use the optical disc when recording/reproducing information on the optical disc by using a disc recording and/or reproducing apparatus, and to the recording and/or reproducing apparatus.

2. Description of the Background Art

With the development of DVD technologies, a disc for recording/reproducing information has been densified. Such a high density optical disc or an important disc is put into a cartridge to protect data safely.

FIG. 1 is a disassembled perspective view of the conventional optical disc cartridge used for a BD (Blu-Ray Disc).

As shown therein, the cartridge of the optical disc includes: a lower case 10 having an access hole 11 which an optical pickup approaches; a pair of a left shutter 20 and a right shutter 30 hinge-coupled with the lower case 10 and opening/closing the access hole 11; a rotary wheel 40 coupled with the pair of shutters 20 and 30 and opening/closing the pair of shutters 20 and 30; an optical disc 50 positioned on the rotary wheel 40; an upper case 60 provided with a viewing hole and covering the pair of shutters 20 and 30, the rotary wheel 40 and the optical disc 50 by being coupled with the lower case 10; and a latch 70 mounted at a corner of the lower case 10 and fixing/releasing the rotary wheel 40.

The lower case 10 has a rectangular plate shape, the access hole 11 having a predetermined shape is penetratingly formed at one side of the, lower case 10, and two bosses 12 with which the left shutter 20 and the right shutter 30 are hinge-coupled project from an inner side of the plate shape.

The left shutter 20 is formed in such a manner that a cam groove 21 having a predetermined shape is formed at a plate having a predetermined shape, a hinge hole 22 into which the boss 12 is inserted is formed at one side of the plate, a first fixing protrusion 23 is formed at a side portion of the hinge hole 22, and a second fixing protrusion 24 is formed at an opposite side to the hinge hole 22.

The right shutter 30 is formed in such a manner that a cam groove 31 having a predetermined shape is formed at the plate having the predetermined shape, a hinge hole 32 into which the boss 12 is inserted is formed, and a first fixing protrusion 33 is formed at a side portion of the hinge hole 32.

The left shutter 20 and the right shutter 30 are movably coupled with the lower case 10 in order that bosses 12 are rotatably inserted into the hinge holes 22 and 32 respectively.

The rotary wheel 40 is formed such a manner that the rotary wheel 40 has a ring shape, a plurality of gear portions 41 are formed at an outer circumferential surface of one side of the ring shape, a fixing groove 42 which the latch 70 is inserted into is formed at a side of the gear portions 41, and cam protrusions 43 respectively inserted into the cam groove 21 of the left shutter 20 and the cam groove 31 of the right shutter 30 are formed at one surface of the ring shape. The rotary wheel 40 is positioned on the left shutter 20 and the right shutter 30 in order that the cam protrusions 43 are inserted into the cam groove 21 of the left shutter 20 and the cam groove 31 of the right shutter 30. A part of the rotary wheel 40 is formed inclined.

The disc is laid on the rotary wheel 40.

The latch 70 is rotatably coupled with one corner of the lower case 10, and one side of the latch 70 protrudes outside the lower case 10. The latch 70 is provided with an elastic portion 71 supported at a side wall of the lower case 10. In the latch 70, when the left shutter 20 and the right shutter 30 close the access hole 11 of the lower case 120, one side of the latch 70 is inserted into the fixing groove 42 of the rotary wheel, and the latch 70 fixes the rotary wheel 40 according to insertion of the latch 70 into the fixing groove 42 of the rotary wheel.

The upper case 60 has a quadrangular shape corresponding to the lower case 10. The viewing hole 61 having an inner diameter smaller than an outer diameter of the optical disc 50 is penetratingly formed in the upper case 60.

The lower case 10 and the upper case 60 are coupled with each other through a plurality of screws (not shown).

An operation of the above-described optical disc is as follows.

In the optical disc cartridge, information is recorded or reproduced on the optical disc 50 positioned on the optical disc cartridge by the disc recording and/or reproducing apparatus. Before the optical disc cartridge is inserted into the disc recording and/or reproducing apparatus, the left shutter 20 and the right shutter 30 close the access hole 11 of the lower case 10, and a part of the latch 70 is inserted into the fixing groove 42 of the rotary wheel so as to prevent rotation of the rotary wheel 40.

In a state that the left shutter 20 and the right shutter 30 close the access hole 11, the first fixing protrusions 23 and 33 of the left shutter 20 and the right shutter 30 and the second fixing protrusion 24 of the left shutter press an upper surface of the optical disc 50, thereby fixing the optical disc 50.

By pressing an upper surface of the optical disc 50 at three points by the first and second fixing protrusions 23 and 33 of the left shutter and right shutter and the second fixing protrusion 24 of the left shutter, fine foreign materials such as dust can be prevented from coming in, and besides the damage on a record surface of the optical disc can be prevented in case vibration is applied thereto.

And, when the optical disc cartridge is inserted into the disc recording and/or reproducing apparatus, a part of the latch 70 protruding outside the lower case 10 is pressed, the latch 70 is angle-rotated, and the part of the latch 70 is separated from the fixing groove 42. And, as a rack (not shown) provided with the recording and/or reproducing apparatus is engaged with the gear portions 41 and moved, the rotary wheel 40 is rotated. As the rotary wheel 40 is rotated, the cam protrusions 43 of the rotary wheel are respectively moved along the cam groove 21 of the left shutter 20 and the cam groove 31 of the right shutter 30.

As the cam protrusions 43 of the rotary wheel are respectively moved along the cam groove 21 of the left shutter 20 and the groove 31 of the right shutter 30, the left shutter 20 and the right shutter 30 are angle-rotated centering on the bosses 12 serving as an axis. According to angle-rotation of the left shutter 20 and the right shutter 30 respectively, the access hole 11 of the lower case 120 is opened, and the first fixing protrusions 23 and 33 and the second fixing protrusion 24 release fixation of the optical disc 50.

And, an optical pickup of the disc recording and/or reproducing apparatus approaches a record surface of the optical disc through the access hole 11 to reproduce or record data.

Meanwhile, a high density optical disc can be used in a state of being accommodated in a cartridge. However, with the development of disc reproduction technologies, by directly inserting the optical disc into a disc recording and/or reproducing apparatus without accommodating the optical disc in the cartridge, information is reproduced and recorded. For this case, the optical disc should be not only accommodated in the cartridge easily, but also the accommodated optical disc should be able to be easily drawn out.

However, in the above-described conventional optical disc, in case the optical disc 50 is accommodated in the cartridge, after accommodating the optical disc 50 in the rotary wheel 40 positioned in the lower case 10, the upper case 60 covers the lower case 10, and the upper case 60 and the lower case 10 are coupled with each other by a plurality of screws. When the optical disc 50 is drawn out from the cartridge, a plurality of screws are loosened, the upper case 60 is opened, and the optical disc 50 is separated. Accordingly, a job for accommodating and taking out the optical disc 50 in/from the cartridge is comparatively complicated and difficult, and besides a separate instrument is required.

SUMMARY OF THE INVENTION

Therefore, an object of the present invention is to provide an optical disc cartridge which enables to facilitate accommodating an optical disc in the cartridge or drawing out the accommodated optical disc in order to use the cartridge or directly use the optical disc when recording/reproducing information on the optical disc using a disc recording and/or reproducing apparatus.

Another object of the present invention is to provide the disc recording and/or reproducing apparatus in order to recording or reproduce information on or from the disc inserted in the optical disc cartridge.

To achieve these and other advantages and in accordance with the purpose of the present invention, as embodied and broadly described herein, there is provided an optical disc cartridge including: a casing provided with a disc inserting/opening part for inserting/taking out a disc thereinto/therefrom at an upper surface thereof and an access hole which an optical pickup approaches at a lower surface thereof; a pair of shutters mounted in the casing and opening/closing the access hole and fixing the disc; a rotary wheel rotatably positioned on the shutters and moving the shutters; a wheel fixing/releasing means mounted at one side in the casing and fixing/releasing the rotary wheel; and a disc fixing/releasing means movably mounted at the casing and limiting inserting/taking out the disc into/from the disc inserting/opening part by adjusting a size of the disc inserting/opening part.

To achieve these and other advantages and in accordance with the purpose of the present invention, as embodied and broadly described herein, there is provided an apparatus of recording or reproducing data on or from an optical disc, comprising: a driving unit rotating an optical disc inserted in the optical disc cartridge; and a recording or reproducing unit recording or reproducing data on or from the optical disc.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
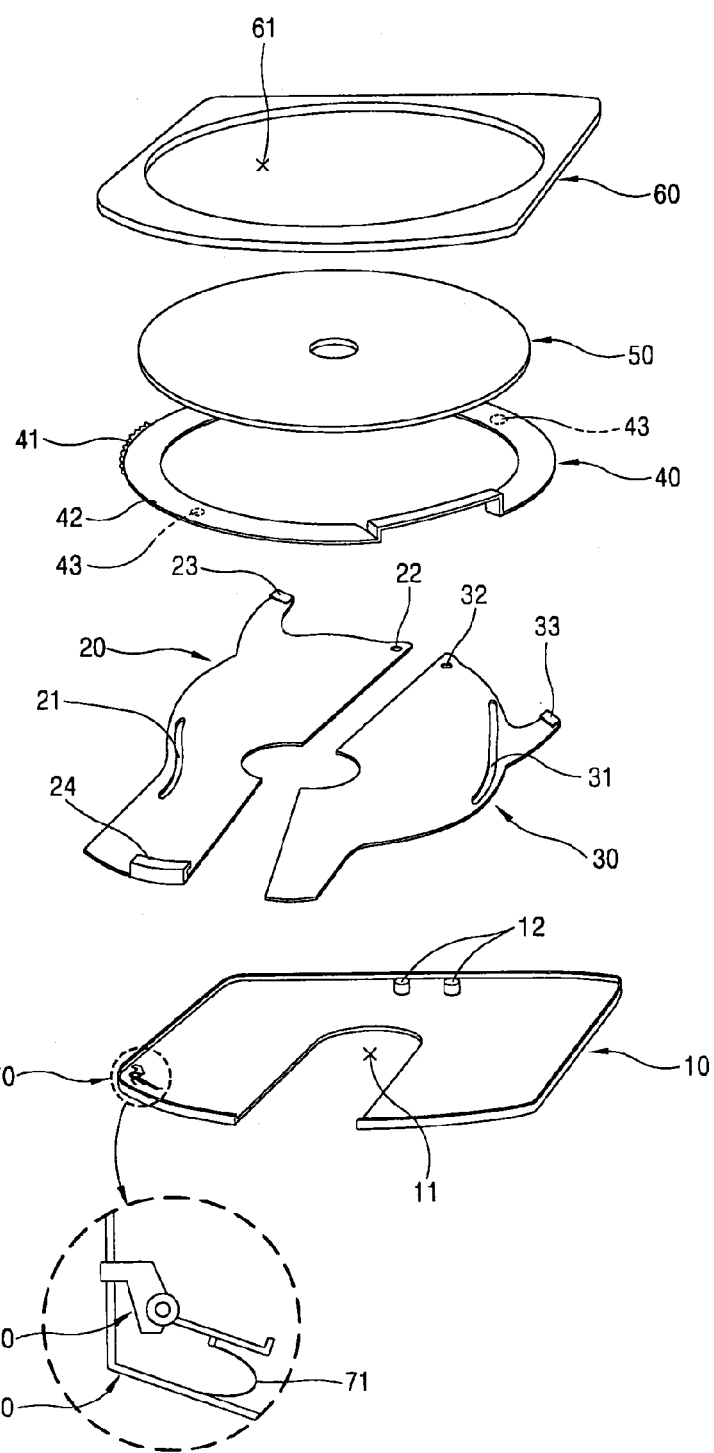
FIG. 1 is a disassembled perspective view of the conventional optical disc cartridge.
Figure 2:
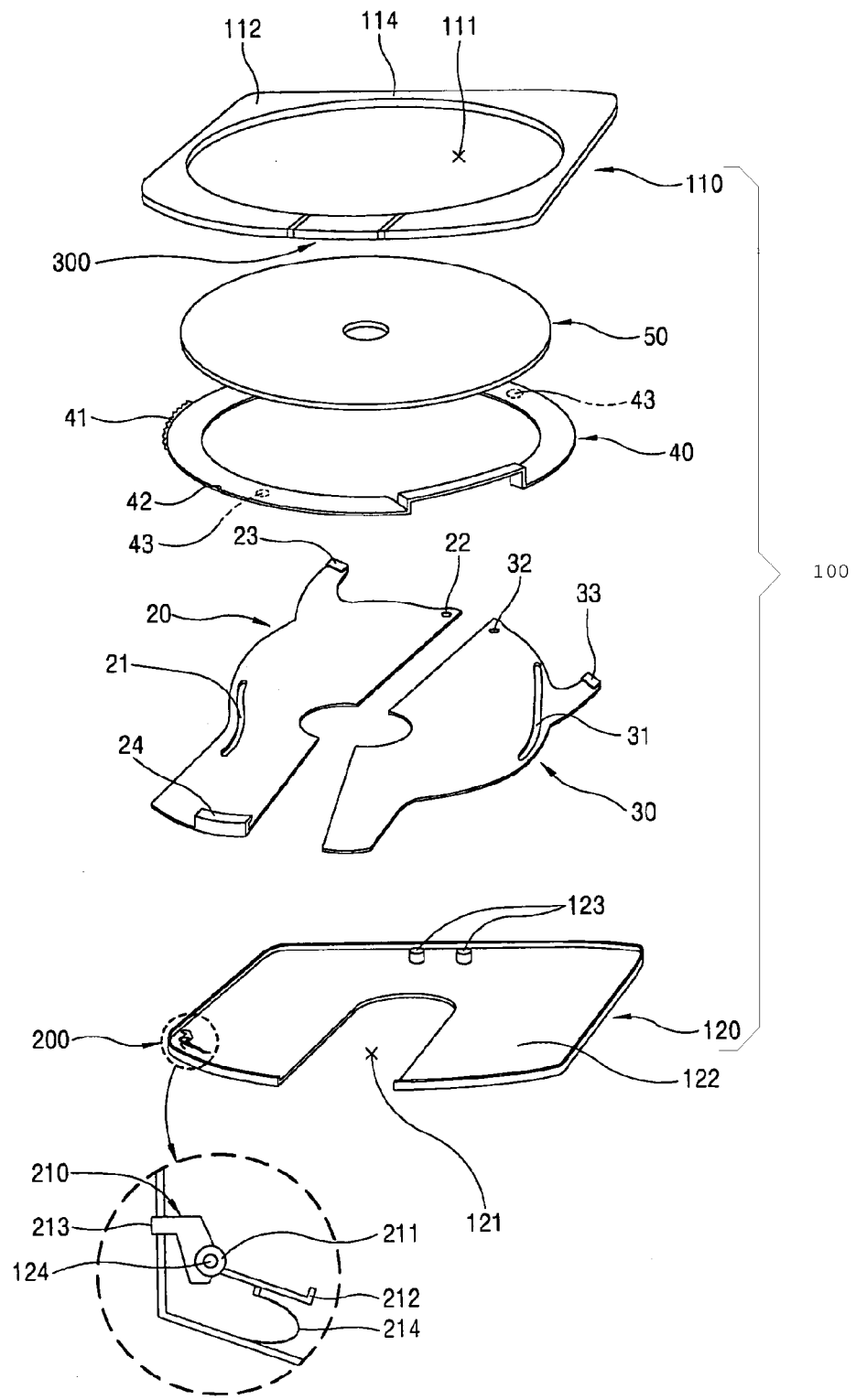
FIG. 2 is a disassembled perspective view of an optical disc cartridge in accordance with the present invention.
Figure 3:
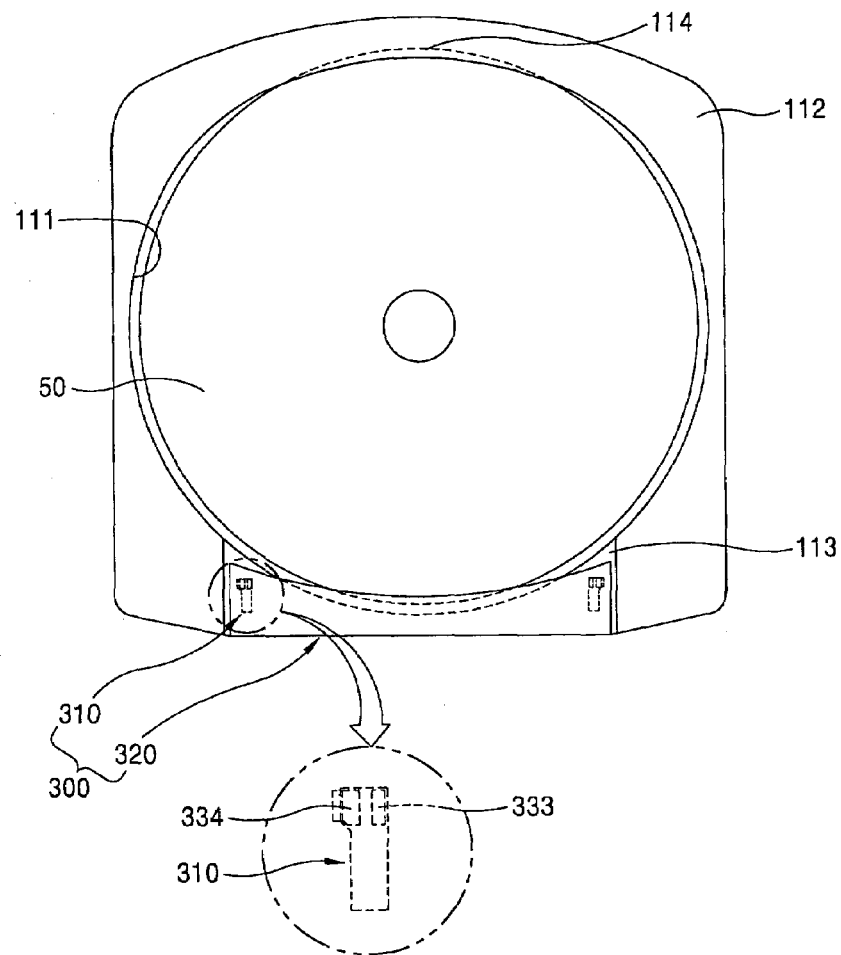
FIGS. 3 and 4 are a plane view and a front view showing the optical disc cartridge in accordance with the present invention.
Figure 4:
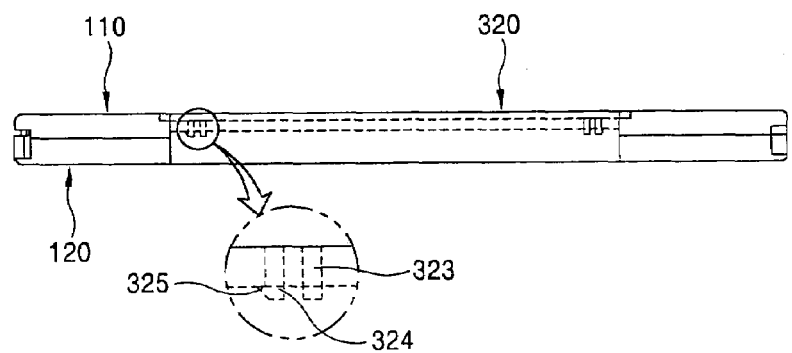

FIG. 2 is a disassembled perspective view of one embodiment of an optical disc cartridge in accordance with the present invention, and FIGS. 3 and 4 are a plane view and a front view. The same reference numerals are given to the same parts to the conventional art.

As shown therein, an optical disc cartridge of the present invention includes: a casing 100 provided with a disc inserting/opening part 111 for inserting/taking out a disc thereinto/therefrom at an upper surface thereof and an access hole 121 which an optical pickup approaches at a lower surface thereof; a pair of shutters 20 and 30 mounted in the casing 100 and opening/closing the access hole 121 and fixing the optical disc 50; a rotary wheel 40 rotatably positioned on the shutters 20 and 30 and moving the shutters 20 and 30; a wheel fixing/releasing means 200 mounted at one side in the casing and fixing/releasing the rotary wheel 40; and a disc fixing/releasing means 300 movably mounted at the casing 100 and limiting inserting/taking the disc into/from the disc inserting/opening part 111 by adjusting a size of the disc inserting/opening part 111.

The casing 100 includes: an upper case 110 provided with a disc inserting/opening part 111 penetrated thereinto with a predetermined inner diameter; and a lower case 120 formed corresponding to the upper case 110 and provided with the access hole 121 to be coupled with the upper case 110.

In the lower case 120, the access hole 121 having a predetermined shape is penetratingly formed at one side of a plate portion 122 having a quadrangular shape, and two bosses 123 with which a pair of shutters 20 and 30 are hinge-coupled protrude at one side of the plate portion 122. The bosses 123 are positioned apposite to the access hole 121.

In the upper case 110, the disc inserting/opening part 111 having an inner diameter greater than an outer diameter of the optical disc 50 is formed at the plate portion 112 having a quadrangular shape corresponding to the lower case 120, and a sliding groove 113 at which the disc fixing/releasing means 300 is positioned is formed at one side of the plate portion 112. An inner diameter of the disc inserting/opening part 111 is formed greater than an outer diameter of the optical disc 50, and a stopping region 114 greater than radius of curvature of the disc inserting/opening part is provided with one side of the disc inserting/opening part. The sliding groove 113 has predetermined area and depth.

The upper case 110 and the lower case 120 are engaged by a plurality of screws (not shown) to be coupled with each other.

The pair of shutters 20 and 30 are the left shutter 20 and the right shutter 30 respectively. The left shutter 20 and the right shutter 30 are formed identical with the conventional structure, and detailed description is omitted. The left shutter 20 and the right shutter 30 are coupled with the lower case 120 by rotatably inserting the bosses 123 of the lower case into the hinge holes 22 and 32.

The rotary wheel 40 has the same structure as the conventional art, and detailed description is omitted. The rotary wheel 40 is positioned on the left shutter 20 and the right shutter 30 in order the cam protrusions 43 are respectively inserted into the cam groove 21 of the left shutter and the cam groove 31 of the right shutter.

The optical disc 50 is positioned on the rotary wheel 40.

The wheel fixing/releasing means 200 includes: a fixing pin portion 124 protruding from one corner of the lower case 120 at a predetermined height; and a latch 120 rotatably inserted into the fixing pin portion 124. The latch 210 includes: a body portion 211 formed in a predetermined shape and having a penetrating hole into which the fixing pin portion 124 is inserted; a stopping portion 212 extended from one side of the body portion 211 and inserted into the fixing groove 42 of the rotary wheel to be stopped; a pressing portion 213 extended from the other side of the body portion 211; and an elastic portion 214 curvedly extended from one side of the stopping portion 212.

In the latch 210, in a state that the left shutter 20 and the right shutter 30 close the access hole 121 of the lower case, the stopping portion 212 of the latch is inserted into the fixing groove 42 of the rotary wheel. At this time, the pressing portion 213 of the latch protrudes outside of the lower case 120. By inserting the stopping portion 212 of the latch into the fixing groove 42 of the rotary wheel, the latch 210 fixes the rotary wheel 40.

Figure 5:
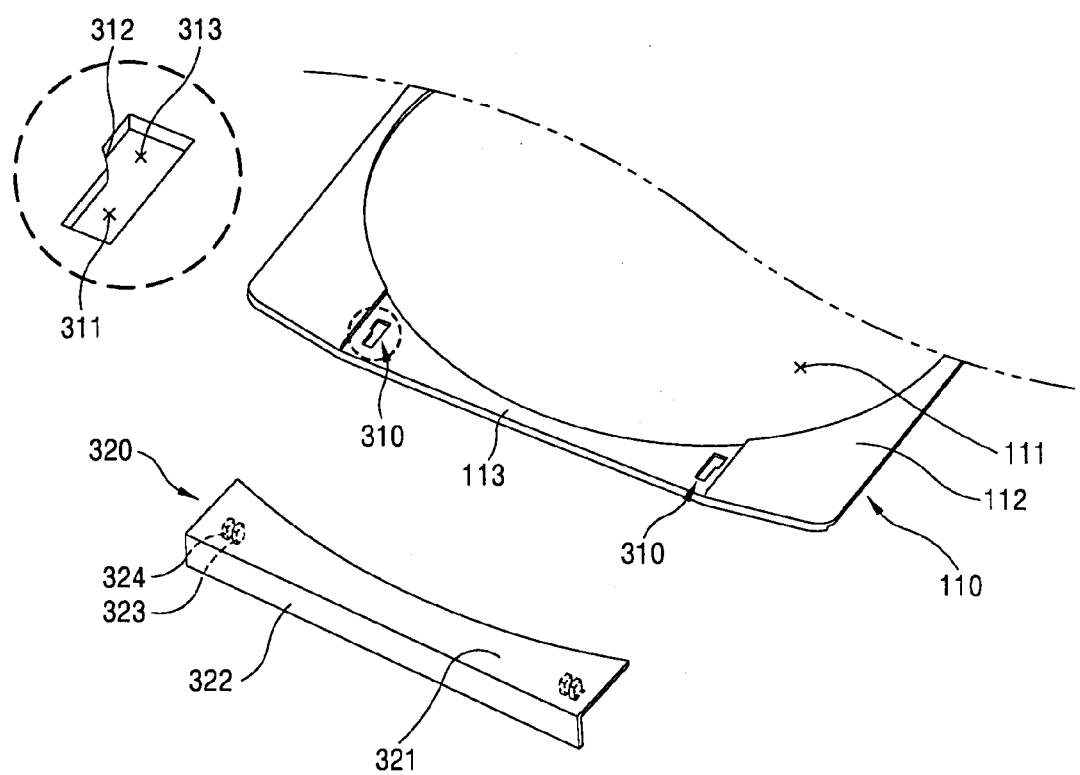
FIG. 5 is a disassembled perspective view of a disc fixing/releasing means constituting the optical disc cartridge in accordance with the present invention.

As shown in FIGS. 3, 4 and 5, the disc fixing/releasing means 300 includes: guide holes 310 formed on an upper surface of the casing 100 at regular intervals; and a reciprocating type overlapping member 320 formed in a predetermined shape and reducing a size of the disc inserting/opening part 111 by being overlapped with the disc inserting/opening part 111 of the casing while moving along the guide holes 310.

The guide holes 310 are penetratingly formed in the sliding groove 113 of the upper case at regular intervals. The guide holes 310 include a moving portion 311 formed in predetermined width and height and an extending portion 313 extended from one side of the moving portion 311 in order to form a stopping portion 312. The extending portion 313 is to be positioned at the disc inserting/opening part 111.

The reciprocating type overlapping member 320 includes: a horizontal portion 321 formed in a quadrangular shape having a certain thickness and positioned at the sliding groove 113 of the upper case; a vertical portion 322 curvedly extended from one side of the horizontal portion 321 in order to have a predetermined area; and guide portions protruding from one surface of the horizontal portion 321 and respectively inserted into the guide holes 310. One surface of horizontal portion 321 is formed in a curved shape greater than radius of curvature of the disc inserting/opening part 111.

The guide portions include a first protrusion 323 and a second protrusion 324 respectively protruding from one surface of the horizon portion 321 of the reciprocating type overlapping member, and the first protrusion 323 and the second protrusion 324 are positioned adjacent to each other. And, a stopping projection 325 is provided with an end portion of the second protrusion 324. Two guide portions are formed at regular intervals, and the intervals are the same as those of the guide holes 310.

The reciprocating type overlapping member 320 is coupled with the sliding groove 113 of the upper case in order that the guide portions are respectively inserted into guide holes 310 of the upper case.

The horizontal portion 321 of the reciprocating type overlapping member is positioned in the sliding groove 113, and the vertical portion 322 is positioned at a side surface of the upper case 110. The first protrusion 323 and the second protrusion 324 comprised of the guide portions are penetratingly inserted into the guide holes 310 and are resiliently supported at inner walls of the guide holes 310, and the stopping projection 325 of the second protrusion is stopped at a lower surface of the upper case 110.

An operation of the above-described disc fixing/releasing means will be described as follows.

Figure 6:
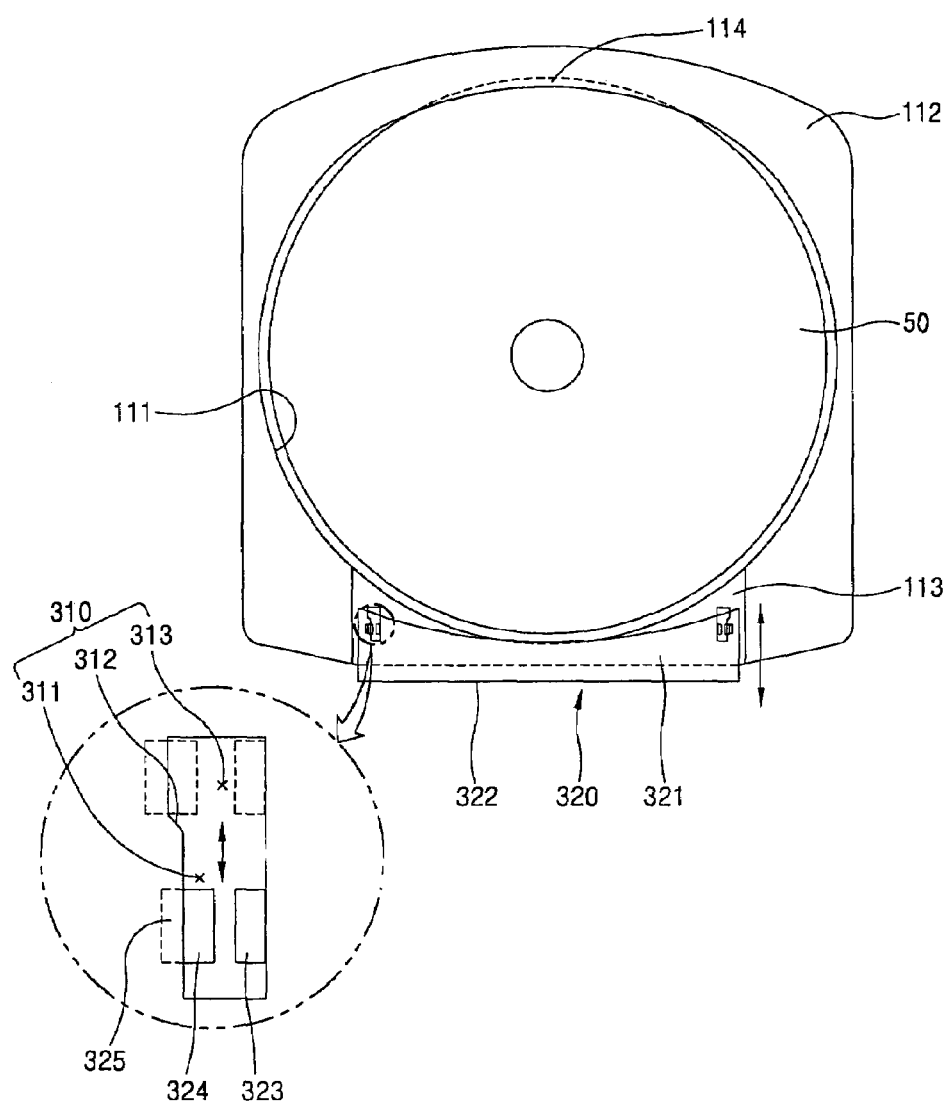
FIG. 6 is a plane view showing an operation of the optical disc cartridge in accordance with the present invention.

As shown in FIG. 6, when the reciprocating type overlapping member 320 is pushed toward the disc inserting/opening part 111, the reciprocating type overlapping member 320 is moved toward the disc inserting/opening part 111, and thus the horizontal portion 321 is overlapped with the disc inserting/opening part 111. At this time, the first protrusion 323 and the second protrusion 324 are positioned at the extending portion 313 of the guide holes, and the second protrusion 324 is stopped at the stopping portion 312.

And, if the reciprocating type overlapping member 320 is pulled in an opposite direction to the disc inserting/opening part 111, the reciprocating type overlapping member 320 is moved toward an opposite direction of the disc inserting/opening part 111, so that the horizontal portion 321 is not overlapped with the disc inserting/opening part 111. At this time, the first protrusion 323 and the second protrusion 324 are bent to be separated from the stopping portion 312, and thus positioned at a side of the moving portion 311.

Figure 7:
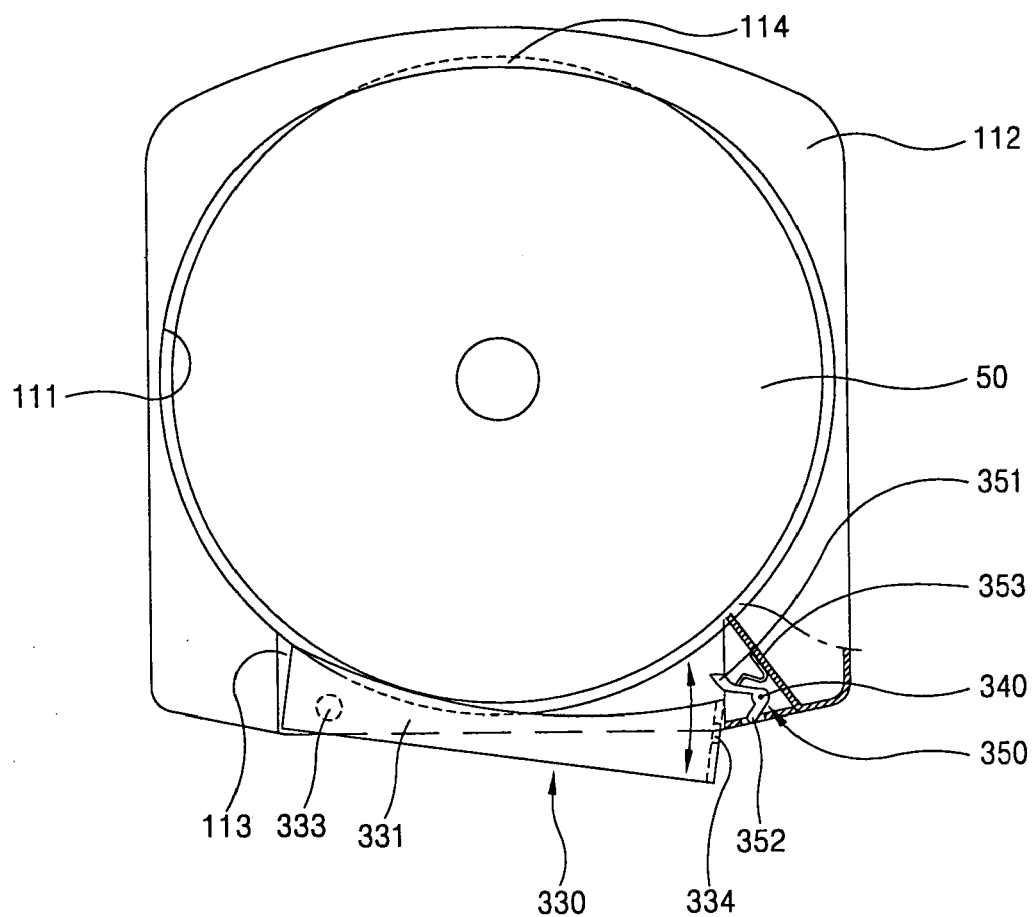
FIG. 7 is a plane view showing a modified example of the disc fixing/releasing means constituting the optical disc cartridge.

In addition, for another modified example of the disc fixing/releasing means, as shown in FIG. 7, the disc fixing/releasing means 300 includes: a rotary type overlapping member 330 hinge-coupled with the upper case 110, angle-rotated centering on the hinge axis and overlapped with the disc inserting/opening part 111, thereby reducing a size of the inserting mounting 111; and a detachable means for attaching/detaching the other side of the rotary type overlapping member 330 to/from the casing 100.

Figure 8:
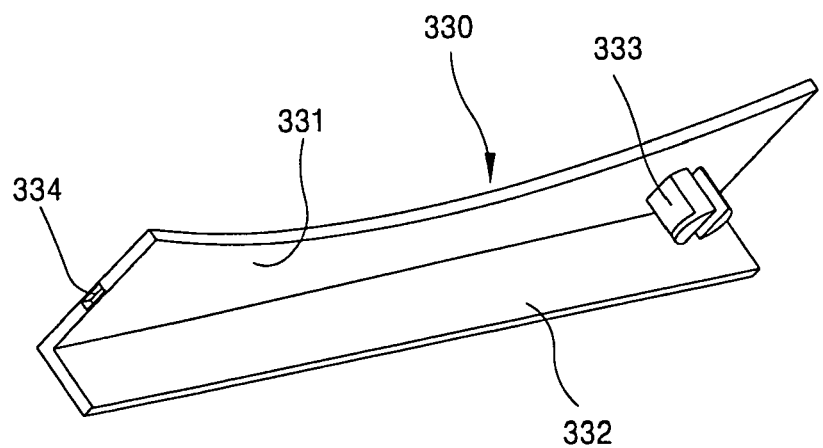
FIG. 8 is a perspective view of a rotary type overlapping member constituting the optical disc cartridge in accordance with the present invention.

As shown in FIGS. 7 and 8, the rotary type overlapping member 330 includes: a horizontal portion 331 formed in a quadrangular shape having a predetermined thickness and positioned at the sliding groove 113 of the upper case; a vertical portion 332 curvedly extended from one side of the horizontal portion 331 in order to have a predetermined area;

and a hinge axis portion 333 protruding from one surface of the horizontal portion 331 and coupled with the upper case 110. One side edge of the horizontal portion 331 is formed in a curve greater than an inner diameter of the disc inserting/opening part 111.

The detachable means includes: a stopping groove 334 formed at a side surface portion of the rotary type overlapping member 330; a fixing pin portion 340 formed at the upper case 110; and a detachable member 350 rotatably inserted into the fixing pin portion 340 and resiliently attached/detached to/from the stopping groove 334.

The detachable member 350 includes: a stopping portion 351 curvedly formed with a predetermined length and having its end stopped at the stopping groove 334; a pressing portion 352 extended from the stopping portion 351 at a predetermined angle; a penetrating hole penetratingly formed at a connection portion of the stopping portion 351 and the pressing portion 352; and an elastic portion 353 extended from one side of the stopping portion 351 and supported at one side wall of the casing 100.

An operation of the above-described disc fixing/releasing means will be described as follows.

If one side of the rotary type overlapping member 330 is pushed, the disc fixing/releasing means 300 is rotated at an axis of the hinge axis portion 333 of the rotary type overlapping member to be positioned at the sliding groove 113 of the upper case. At this time, the detachable member 350 is resiliently supported, and the stopping portion 351 of the detachable member is inserted into the stopping groove 334 of the rotary type overlapping member to be fixed. At this time, the pressing portion 352 of the detachable member protrudes outside the upper case 110, and the vertical portion 331 is overlapped with the disc inserting/opening part 111.

In case of releasing an overlapping of the horizontal 331 of the rotary type overlapping member with the disc inserting/opening part 111, if the pressing 352 of the detachable member is pressed, the stopping portion 351 is separated from the stopping groove 334 of the rotary type overlapping member, and in such a state, the rotary type overlapping member 330 is pulled.

Figure 9:
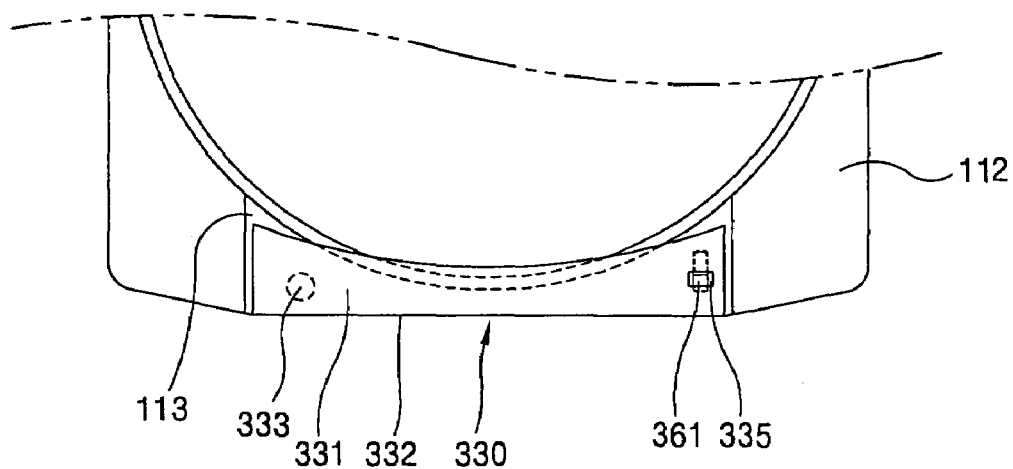
FIGS. 9 and 10 are a plane view and a partial sectional view showing another modified example of a detachable means comprising the optical disc cartridge in accordance with the present invention.
Figure 10:
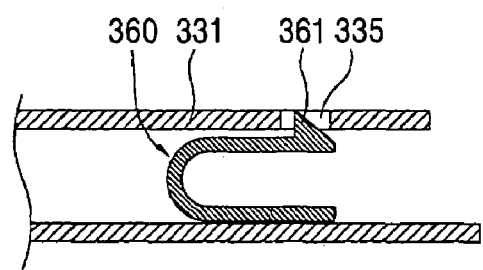

Meanwhile, for a modified example of the detachable means, as shown FIGS. 9 and 10, the detachable means includes: a latch hole 335 penetratingly formed at one side of the rotary type overlapping member 330; and an elastic detachable member 360 formed in a curve shape having a predetermined length, and having one side fixedly coupled with the upper case 110 and the other side provided with a stopping projection 361 attached/detached to/from the latch hole 335.

The latch hole 335 is formed at one side of the horizontal portion 331 of the rotary type overlapping member facing an upper surface of the lower case 110. The elastic detachable member 360 is fixedly coupled with the bottom of the sliding groove 113 of the upper case in order that the stopping projection 361 faces the latch hole 335.

An operation of the above-described detachable means is as follows.

In case of rotating the rotary type overlapping member 330 to be overlapped with the disc inserting/opening part 111, the elastic detachable member 360 is resiliently bent, the stopping projection 361 is inserted into the latch hole 335 of the rotary type overlapping member, and thus the rotary type overlapping member 330 is fixed.

And, in case of releasing an overlapping of the rotary type overlapping member 330 with the disc inserting/opening part 111, after the stopping projection 361 is pressed, the rotary type overlapping member 330 is pulled.

Hereinafter, the operation effect of the optical disc cartridge according to the present invention will now be described as follows.

Firstly, in case the optical disc 50 is inserted into the optical disc cartridge, the wheel fixing/releasing means 200, the latch 210 is pressed to release fixing of the rotary wheel 40, and the rotary wheel 40 is rotated through gear portions 41 of the rotary wheel. According to rotation of the rotary wheel 40, the left shutter 20 and the right shutter 30 are moved centering on the bosses 123 serving as an axis, and the first protrusions 23 and 33 of the right shutter 20 and the right shutter 30 and the second protrusion 24 of the left shutter get widen to an exterior side of the disc inserting/opening part 111.

And, the disc fixing/releasing means 300 is released from an overlapping with the disc inserting/opening part 111, and the optical disc 50 is laid on an surface of the rotary wheel 40 positioned in the casing 100 through the disc inserting/opening part 111. In case that the disc fixing/releasing 300 is the reciprocating type overlapping member 320, by moving the reciprocating type overlapping member 320 in an opposite direction to the disc inserting/opening part 111, an overlapping with the disc inserting/opening part 111 is released. In case that the optical disc fixing/releasing means 300 is the rotary type overlapping member 330, by angle-rotating the rotary type overlapping member 330 centering the hinge axis, an overlapping with the disc inserting/opening part 111 is released.

Also, if the rotary wheel 40 is counter-rotated through gear portions 41, while the left shutter 20 and the right shutter 30 are moved toward a closing position according to the counter-rotating, the first fixing protrusions 23 and 33 of the left shutter 20 and the right shutter 30 and the second fixing protrusion 24 of the left shutter press an upper surface of an edge of the optical disc 50. An end of the latch 210 is inserted into the fixing groove 42 of the rotary wheel, fixing the rotary wheel 40.

In addition, by moving the disc fixing/releasing means 300 in a direction of the disc inserting/opening part 111, the disc fixing/releasing means 300 is overlapped with the disc inserting/opening part 111. By overlapping disc fixing/releasing means 300 with the disc inserting/opening part 111, a size of the disc inserting/opening part 111 is reduced to prevent separation of the optical disc 50.

Meanwhile, even when the optical disc 50 is not fixed by the first fixing protrusions 23 and 33 of the left shutter 20 and the right shutter 30 and the second fixing protrusion hole 24 of the left shutter, the optical disc 50 is not taken out through the stopping region 114 and the disc fixing/releasing means 300.

And, in case the optical disc 50 accommodated in the optical disc cartridge is drawn out, by inversely operating the above-described process, the optical disc 50 positioned in the casing 100 is pulled out through the disc inserting/opening part 111.

The optical disc 50 is accommodated in the optical disc cartridge to be inserted into the disc recording and/or reproducing apparatus, and the optical disc can be directly inserted into the reproducing means. A case that the optical disc is accommodated in the optical disc cartridge, and then is inserted into the disc recording and/or reproducing apparatus to record or reproduce information is the same as description of the conventional art.

As so far described, in an optical disc cartridge of the present invention, in case that a high density optical disc is accommodated in or taken out from the optical disc cartridge, without separating the upper case 110 from the lower case 120 constituting the casing 100, the high density optical disc 50 can be accommodated in or drawn out, so that a job of accommodating or taking out the optical disc 50 can be simple and easy, thereby increasing user's convenience.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An optical disc cartridge comprising:
   a casing provided with a disc inserting/opening part for inserting/taking out a disc thereinto/therefrom at an upper surface thereof and an access hole which an optical pickup approaches at a lower surface thereof;
   a pair of shutters mounted in the casing for opening/closing the access hole and fixing the optical disc;
   a rotary wheel rotatably positioned on the shutters for moving the shutters;
   a wheel fixing/releasing means mounted at one side in the casing for fixing/releasing the rotary wheel; and
   a disc fixing/releasing means movably mounted at the casing for limiting inserting/taking out the disc into/from the disc inserting/opening part by adjusting a size of the disc inserting/opening part, comprising:
      substantially L-shaped guide holes formed on an upper surface of the casing, each one of the guide holes having a moving portion formed with predetermined width and height and an extending portion extended from one side of the moving portion in order to form a stopping portion; and
      a reciprocating type overlapping member formed in a predetermined shape and having guide portions adapted to fit into and move back and forth in the guide holes for reducing a size of the disc inserting/opening part,
   wherein the overlapping member reduces the size of the disc inserting/opening part by being overlapped with the disc inserting/opening part of the casing.

2. The optical disc cartridge of claim 1, wherein the movably mounted disc fixing/releasing means limits insertion/taking out the disc by a linear reciprocating means.

3. The optical disc cartridge of claim 1, wherein the overlapping member reduces the size of the disc inserting/opening part by being overlapped with the disc inserting/opening part of the casing while moving along the guide holes.

4. The optical disc cartridge of claim 3, wherein the reciprocating type overlapping member comprises:
   a horizontal portion formed in a quadrangular shape having a certain thickness and surface-contacting the casing; and
   a vertical portion curvedly extended from one side of the horizontal portion in order to have a predetermined area; and
   wherein the guide portions protrude from one surface of the horizontal portion.

5. The optical disc cartridge of claim 4, wherein one surface of horizontal portion is formed in a curved shape greater than radius of curvature of the disc inserting/opening part.

6. The optical disc cartridge of claim 1, wherein the guide portions comprise:
   a first protrusion protruding with a certain length; and
   a second protrusion protruding adjacent to the first protrusion with a certain length an provided with a stopping projection at its end portion.

7. The optical disc cartridge of claim 1, wherein a sliding groove having a certain area is formed at the upper surface of the casing, and the reciprocating type overlapping member is positioned in the sliding groove.

8. An optical disc cartridge comprising:
   a casing provided with a disc inserting/opening part for inserting/taking out a disc thereinto/therefrom at an upper surface thereof and an access hole which an optical pickup approaches at a lower-surface thereof;
   a pair of shutters mounted in the casing for opening/closing the access hole and fixing the optical disc;
   a rotary wheel rotatably positioned on the shutters for moving the shutters;
   a wheel fixing/releasing means mounted at one side in the casing for fixing/releasing the rotary wheel; and
   a disc fixing/releasing means movably mounted at the casing for limiting inserting/taking out the disc into/from the disc inserting/opening part by adjusting a size of the disc inserting/opening part, wherein the disc fixing/releasing means comprises:
      guide holes formed on an upper surface of the casing at regular intervals; and
      a reciprocating type overlapping member formed in a predetermined shape for reducing a size of the disc inserting/opening part, wherein the member reduces the size of the disc inserting/opening part by being overlapped with the disc inserting/opening part of the casing while moving along the guide holes, wherein the guide holes comprise:
         a moving portion formed in predetermined width and height; and
         an extending portion extended from one side of the moving portion in order to form a stopping portion, the extending portion being wider that the moving portion.

9. The optical disc cartridge of claim 8, wherein the movably mounted disc fixing/releasing means limits insertion/removal of the disc by a linear reciprocating motion.

* * * * *